Patented Jan. 8, 1952

2,582,204

UNITED STATES PATENT OFFICE 2,582,204

TETRAALKYL MONOTHIOPYROPHOSPHATE AS AN INSECTICIDE

Gennady M. Kosolapoff, Dayton, Ohio, assignor to Monsanto Chemical Company, St. Louis, Mo., a corporation of Delaware No Drawing. Application June 26, 1948, Serial No. 35,511

5 Claims. (Cl. 167—22)

This invention provides a new, insecticidal product and also provides a process for combating insect pests.

I have discovered that the tetraalkyl monothiopyrophosphates are particularly effective as insecticides.

One member of the tetraalkyl monothiopyrophosphate is known. The known compound is the tetraethyl monothiopyrophosphate, which was first prepared by Arbuzov (Journal General Chemistry USSR, 2, 348 (1932)) by an involved reaction sequence, yielding the product in an overall yield of only about 10% of theory.

In my copending application Serial No. 35,512, filed of even date herewith, now Patent No. 2,567,154, I have disclosed and claimed a method for producing tetraalkyl monothiopyrophosphates, whereby the product may be prepared in at least 35% to 40% or higher yields.

The above-mentioned patent application describes and claims the production of any tetraalkyl monothiopyrophosphate and is particularly valuable for the production of those esters which have from 1 to 18 carbon atoms in the alkyl group.

I have now found that whereas most of the tetraalkyl monothiopyrophosphates have some insecticidal activity against insects such as red spiders, mites, aphids, etc., the tetraalkyl esters, where the alkyl group has at least two carbon atoms and not in excess of three carbon atoms, are particularly effective and highly efficient for combating insect pests.

The following esters are specifically mentioned by reason of their pronounced effectiveness:

1. Tetraethyl monothiopyrophosphate.
2. Tetra-(n-propyl) monothiopyrophosphate.
3. Tetra-(isopropyl) monothiopyrophosphate.
4. Diethyl di-n-propyl monothiopyrophosphate.
5. Diethyl diisopropyl monothiopyrophosphate.

The tetraalkyl monothiopyrophosphates may be obtained by the interaction of dialkyl phosphoryl chloride and dialkyl sodium thiophosphate. The reaction which takes place involves a condensation of the reactants and may be illustrated by the following equation:

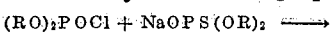
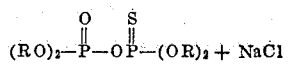

where R represents any primary or secondary group of from 1 to 18 carbon atoms.

By a suitable choice of reactants, any of the simple or mixed esters mentioned above, as well as others, may be prepared.

The reaction above illustrated may be carried out either in the absence or in the presence of a solvent. The use of a solvent is generally advisable since by its use a somewhat larger yield of product is obtained. Almost any inert hydrocarbon solvent, such as benzene, toluene, xylene, petroleum hydrocarbons, monochlorobenzene or mixtures thereof may be employed.

The temperature of reaction may range from room temperature up to temperatures of 100° C. When it is desired to use temperatures above the boiling point of the solvent where the same is employed, the reaction may be carried out under pressure.

The product, produced by the above process followed by vacuum distillation, may be employed for insecticidal purposes in the pure form as thus obtained. In many cases, however, it may not be necessary to purify the product by distillation, or by other means. Moreover, since the sodium chloride formed as a by-product is generally inert with respect to vegetation upon which the insecticide may be employed, the presence of such sodium chloride is not objectionable and therefore this material may be permitted to remain in the reaction product and the entire crude reaction product employed, as hereinafter described, for combating insects or in the compounding of insecticidal compositions.

Either the purified or the crude tetraalkyl monothiopyrophosphate may be mixed with carriers such as solvents, emulsions or powders and applied to insect-infested vegetation in the usual manner.

Solvents suitable for dissolving the tetraalkyl monothiopyrophosphate may be any hydrocarbon oil or aromatic hydrocarbon which preferably is limited to those hydrocarbon liquids which boil within the range of about 176° F. and 760° F. at atmospheric pressure. Typical examples of suitable hydrocarbon oils are benzene, toluene, xylene, monomethyl naphthalenes, dimethyl naphthalenes, trimethyl naphthalenes, tetramethyl naphthalenes, ethyl naphthalenes, pine oil and mixtures of oils containing aromatic hydrocarbons. Also petroleum fractions boiling within the above range, which are aromatic in nature or containing at least 15% (and preferably 20%) of aromatic hydrocarbon, may also be used.

Solutions prepared utilizing the above solvents should have a concentration of active ester usually varying from 0.5 part of ester per 1000 parts of solvent up to 5% to 10% by weight of solvent. In many cases it is possible to carry out the reaction set forth above in an aromatic or non-aromatic solvent and then by the addition of one or more of the above-mentioned solvents to dilute the reaction mixture to the desired concentration effective for combating insect pests.

Emulsions containing the active ester may be made from various hydrocarbon solutions as described above merely by the addition of such solutions to water. In general, hydrocarbon solutions of active ester are mixed with water and various emulsifiers are added which serve to maintain the hydrocarbon oil as an oil-in-water emulsion. Suitable emulsifiers are surface active agents such as organic sulfates or sulfonates having a Draves wetting time of 10.5 seconds or less in 0.5% aqueous solution. The method of determining the Draves wetting time is described in the 1944 Yearbook of the American Association of Textile Chemists and Colorists, 21, 199. Specific examples within this class of surface active agents are the alkali metal and amine salts of mono-, di- or trisulfonated aromatic hydrocarbons of the benzene series such as benzene, toluene and xylene, wherein the aromatic nucleus also contains an aliphatic side chain having from 10 to 18 (and preferably 10 to 14) carbon atoms. Typical examples of these emulsifying agents are the alkali metal, preferably sodium salts of decyl, dodecyl, tetradecyl or octadecyl benzene sulfonic acids, as well as the corresponding di- or trisulfonated products.

Additional examples of sulfonated and sulfated wetting agents which are suitable are the sulfosuccinic acid, dialkyl esters such as sodium dihexylsulfosuccinate, sodium dioctyl sulfosuccinate, sodium dodecyl sulfosuccinate and the like.

Other types of surface active agents, for example, those products which consist of condensation products of alkylene oxide, specifically ethylene oxide with a branched chain mercaptan may also be used. Branched chain mercaptans employed for this purpose are preferably produced from aliphatic petroleum hydrocarbons, in particular polymerized propylene or butylene, the resulting polymer olefin then being reacted with hydrogen sulfide in known manner to produce a branched chain mercaptan. Such products are preferably reacted with sufficient ethylene oxide so as to furnish from 5 to as high as 40 moles of condensed ethylene oxide per mole of mercaptan.

The combination of aromatic oils with sulfonated or sulfated hydrocarbons and the branched chain mercaptan-ethylene oxide condensation products for the purpose of producing insecticidal emulsions is more fully disclosed and claimed in application Serial No. 719,109, filed December 28, 1946, in the name of Milton Kosmin, now Patent No. 2,552,187, which application is assigned to the same assignee as is the present case.

Dry powders for dusting purposes, such as those composed of bentonite, pyrophyllite, wood flour, finely divided dusting sulfur, carbon black, etc. may also be mixed with the present tetraalkyl monothiopyrophosphates for the purpose of producing insecticides suitable for application in this manner. Dusting powders of this type should contain generally from 0.01% to 5% or 10% by weight of the active constituent.

The following more specific examples illustrate various insecticidal compositions wherein a tetraalkyl monothiopyrophosphate is employed as the active constituent:

*Example 1*

One part by weight of tetraethyl monothiopyrophosphate was dissolved in 1000 parts of xylene and sprayed upon red spider mites on rose leaves. One hundred per cent of the mobile forms of this insect were killed. In addition, it was determined that from 20% to 30% of the eggs present had also been killed.

*Example 2*

An emulsion consisting of equal parts by volume of water and xylene, 1% of the condensation product of ethylene oxide with tetradecyl mercaptan, 1% of dodecyl benzene sodium sulfonate and also containing 0.001% by weight of tetraethyl monothiopyrophosphate was sprayed upon bean, tomato, cucumber and rose plants which were badly infested with aphids. One hundred per cent kill of insects was obtained.

*Example 3*

A dusting powder containing 0.5% by weight of tetraethyl monothiopyrophosphate was prepared using equal quantities of powdered pyrophyllite and bentonite. This powder, when dusted upon infested rose plants gave an excellent control of aphids.

The present esters which comprise the active constituents of my insecticidal composition is considerably more effective against the various insects such as red spiders, mites, aphids, etc. than is either hexaethyl tetraphosphate or tetraethyl pyrophosphate. It is more resistant to hydrolysis; consequently water emulsions may be prepared with the assurance that the useful life of such emulsions will be considerably longer than that obtained from insecticidal emulsions containing either hexaethyl tetraphosphate or tetraethyl pyrophosphate.

The present application is a continuation-in-part of my application Serial No. 785,515, filed November 12, 1947, now abandoned.

Since it is obvious that various changes and modifications may be made in the present invention without departing from the spirit thereof, this invention is not to be restricted to the specific details described herein except as defined in the appended claims.

What I claim is:

1. The process of combating insect pests which comprises applying to insect infested vegetation an insecticide containing tetraethyl monothiopyrophosphate as an active ingredient thereof.

2. The process of combating insect pests which comprises aplying to insect infested vegetation a tetraalkyl monothiopyrophosphate, wherein the alkyl groups contain from 2 to 3 carbon atoms.

3. An insecticidal product comprising a solution of tetraethyl monothiopyrophosphate dissolved in a liquid hydrocarbon solvent, said solvent having a boiling point above about 176° F.

4. An insecticidal product containing an essential active ingredient, tetraethyl monothiopyrophosphate, said tetraethyl monothiopyrophosphate being dissolved in a liquid hydrocarbon solvent having a boiling point above about 176° F.

5. An insecticidal product containing as an essential active ingredient, tetraethyl monothiopyrophosphate and a solvent therefor, said solvent comprising a liquid petroleum hydrocarbon boiling above about 176° F.

GENNADY M. KOSOLAPOFF.

REFERENCES CITED

The following references are of record in the file of this patent:

UNITED STATES PATENTS

| Number | Name | Date |
|---|---|---|
| 2,063,629 | Salzberg et al. | Dec. 8, 1936 |
| 2,495,220 | Bell | Jan. 24, 1950 |

OTHER REFERENCES

Arbuzov, J. Chem. U. S. S. R., vol. 2, p. 348 (1932).

Manuf. Chem. and Manuf. Perfumer, vol. XVIII, 11, Nov. 1947, p. 506.

Ludvik et al., J. Econ. Ent., vol. 40, No. 1, pp. 97–100, Feb. 1947.